Oct. 3, 1961 H. J. LAVERTY 3,002,607
RAZOR BLADE CONTAINER
Filed Jan. 12, 1959

3,002,607
RAZOR BLADE CONTAINER
Howard J. Laverty, Brooklyn, N.Y., assignor to Sterling Precision Corporation, New York, N.Y., a corporation of Delaware
Filed Jan. 12, 1959, Ser. No. 786,233
6 Claims. (Cl. 206—16)

The present invention is concerned with a blade container and particularly with a container having slots therein adapted to receive and hold a supply of blades for a shank type razor blade holder.

In accordance with the general plan and objects of the invention the container has a series of slots each adapted to receive and hold a blade, and an individual blade may be readily removed by sliding the holder into the slot causing the holder to engage over the back of the blade and upon withdrawal of the holder the blade is correctly positioned therein for use. The blades are normally restrained in the container by a movable cap which has an opening positionable at will over a selected slot. In accordance with the preferred form illustrated herein the container is of a generally cylindrical shape with open ended radial blade slots and the movable cap is rotatably mounted over the otherwise open ends of the slots.

The container is constructed and adapted also to serve as a receptacle for used blades and to receive and restrain a used blade in a slot directly from the holder without previous removal of the blade from the holder or the employment of auxiliary devices. The operation consists simply of inserting the holder with blade therein into an empty slot, rotating the cap a slight angle whereby an edge part of the cover opening engages over the end of the blade obstructing its path of movement, and then withdrawing the holder free of the blade.

The complete device includes a form of detent means which cooperates with the other elements of the combination in a particularly convenient manner to position automatically and hold the opening in an elastically releasable manner at the selected slot but permit a limited small amount of free movement at the selected position in accordance with whether a blade is to be inserted or withdrawn at that slot.

The device may be economically manufactured, is attractive in appearance, and conveniently manipulated in use, and has the further marked advantage of enabling blades to be inserted or removed from the holder without the fingers coming in contact with the sharp cutting edge of the blade.

Other objects and advantages of the invention will appear from the description to follow and the invention accordingly comprises a blade container possessing the features, properties and relation of elements which will be exemplified in the constructions hereinafter described.

Reference should be had to the drawings in connection with the description, in which drawings.

Figure 1:
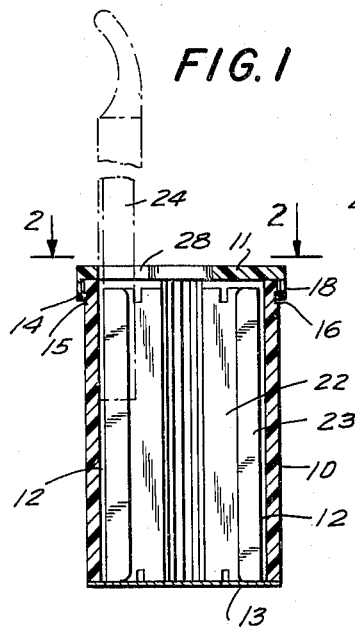
FIG. 1 is a longitudinal cross-sectional view of a representative form of container.
Figure 2:
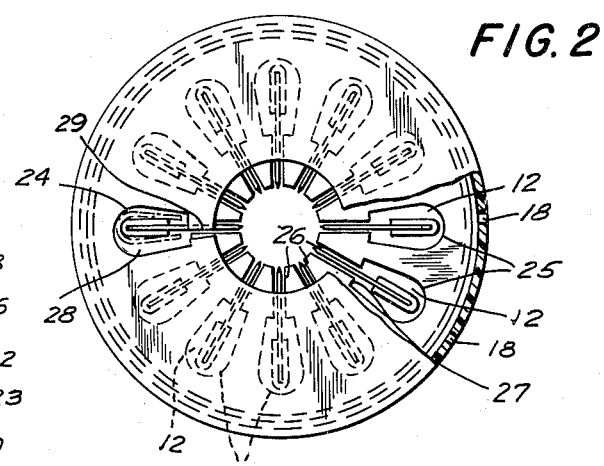
FIG. 2 is an end view looking down in the direction of the arrows 2—2 in FIG. 1.

The container as illustrated in FIGS. 1 and 2 comprises a receptacle of generally cylindrical shape including a body member 10 having a cover 11 rotatably secured thereon. The body member has a series of radial slots 12 extending longitudinally of the body member parallel to the axis, each slot being adapted to receive therein a blade, which in the present case comprises a razor blade adapted to be mounted in a shank type holder. The body member 10 has a closed lower or inner end 13 which may be cast integral with the body member 10 or secured thereto in any suitable manner. The body member is preferably of transparent plastic material which may be slightly tinted if desired in some attractive color. The body member including the lower closed end 13 may be cast in a mold of plastic material in accordance with well known procedures and apparatus.

The cover 11 is rotatably secured to the open end of the body member 10 by any suitable means. In the form shown in FIG. 1 the cover has a skirt 14 provided with an annular inwardly extending rib 15 adapted to engage in an annular groove 16 in the body member. The cover preferably is comprised of a plastic material similar to that of the body member. To enable the cover 11 to be snapped into place more readily over the end of the body member 10 with the flange 15 engaged in the groove 16, the skirt portion 14 preferably is provided with notches 18 at spaced intervals around the periphery. Other forms of securing the cover over the end may be resorted to as will be readily apparent such as a screw threaded through the skirt and extending into a groove in the body member or at the rear of a rib formed on the body member, or as will be described in connection with the forms of FIGS. 3 and 4, a central set screw may extend through the cover and be threaded into a boss integral with the main body member.

The radial slots 12 in the body member are shaped appropriately to receive the particular razor blade. In the present case there is illustrated a standard form of blade 22 having a reinforcing backing 23. The radial slots are further shaped to permit the insertion of a standard shank type blade holder such as indicated in broken lines 24 having a portion U-shaped in cross section adapted to fit over the backing part 23 of the blade. Accordingly the radial slots are of a keyhole shape in general including an outer enlarged area 25 in which the backing part 23 of the blade is mounted and the blade proper extends radially inwardly through a narrowed slot portion 26 having a width larger by a small amount than the thickness of the blade. The central part of the body member may be hollow as in the form of FIGS. 1 and 2 or solid as in the form of FIGS. 3 and 4. The portions are such that the blade including its backing has a certain amount of free movement in the slot, the inward movement towards the center being limited by engagement of the backing against the shoulder 27. The rotatable cover member 11 is provided with a single opening 28 which likewise is of the keyhole type in its general shape. The opening 28 is adapted to be rotated into registry with any one of the slots 12 in the body member whereby a blade may be inserted and restrained in the slot or removed as desired, as will be described in more detail below. One edge of the opening 28 has a finger 29 extending laterally into the narrow part of the opening for a purpose to be described. Detent means are preferably incorporated to enable the positioning more readily of the cover opening 28 over the selected blade opening as will be specifically illustrated in the form of container of FIGS. 3 and 4.

Figure 3:
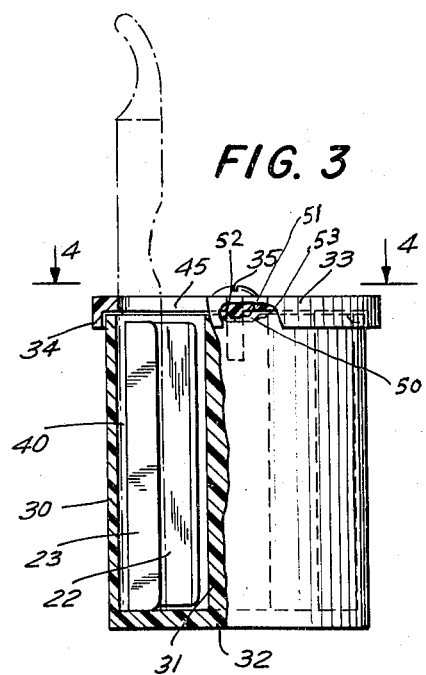
FIG. 3 is a view in elevation of another form of the invention with a longitudinal section broken away.
Figure 4:
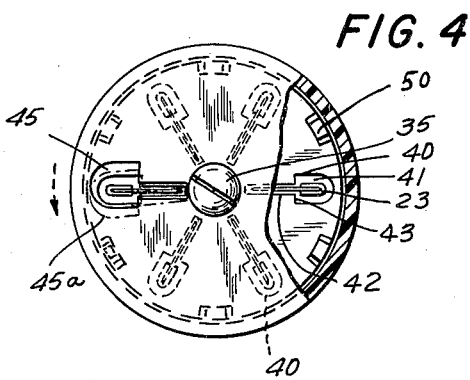
FIG. 4 is an end view looking in the direction of the arrows 4—4 of FIG. 3.

Referring now to the container shown in FIGS. 3 and 4 the arrangement is generally the same as in the first form described, and the container parts may be comprised of similar material. In this second form the body member 30, however, is in general a solid one piece cylindrical part including a central portion 31 and a bottom part 32. It is provided with a cover 33 which has a plain skirt portion 34 adapted to fit freely over the outer end of the cylindrical body member 30. The cover is held against outward movement by a set screw 35 threaded into the central part 32 but the cover is freely rotatable on the screw. The body member 30 is provided in this case with any desired number of slots 40 shown in the particular example of FIG. 4 to be six in number, although the number may be less or greater than six as desired. It will be noted that the form of FIGS. 1 and 2 shows an arrangement of twelve blade slots. Similarly to FIGS. 1 and 2 the blade slots include an outer enlarged portion 41 and an inner narrowed portion 42 for the blade portion proper, the slots 40 having a shoulder 43 against which the backing portion 23 of the blade may engage to limit the inward movement, the blade, however, having considerable play in the slot and the outer portion 41 in particular being sufficiently large to receive the blade holder 24 of the type described in connection with FIG. 1. The cover 33 has an opening 45 therein generally similar to the opening 28 of the form shown in FIGS. 1 and 2. Also one edge portion 46 of the cover at the inner narrowed area of the opening 45 extends over further into the opening than the opposed edge portion and the portion 46 comprises a barrier part adapted to be moved into the path of the blade as will be described further.

As heretofore noted the container embodies conveniently a detent means for positioning the cover opening over the desired selected blade slot. The form of detent may vary as to specific character and location but FIGS. 3 and 4 illustrate a very simple conveniently formed type of detent means which comprises a series of notches 50 extending inwardly from the outer end of the body member adjacent the periphery, there being one notch appropriately located for each of the blade slots 40. The cover 33 is provided with an inwardly projecting tooth or lug 51 as shown particularly in FIG. 4 adapted to engage in any one of the notches 50. The ends of each notch 50 are inclined as indicated particularly at 52 and 53 in FIG. 4 and the lug 51 is accordingly cammed out of the notch as the cover 33 is rotated and conversely rides down the corresponding cam side when the cover is rotated to the next notch. The plastic material permits a limited amount of flexing of the cover in conjunction with the operation of the detent means. In general, therefore, the detent means comprises a locating device for the respective slots. It will be noted, however, that the lug 51 is smaller in peripheral extent than the slots permitting a limited amount of free angular movement for a purpose which will now be described in more detail.

Figure 5:
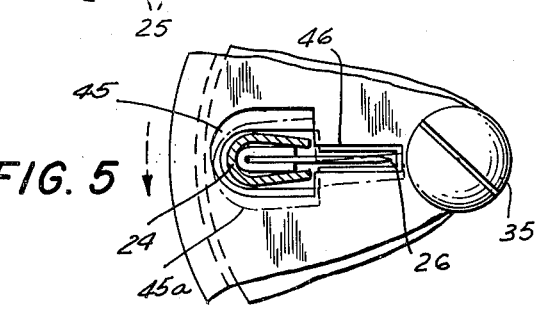
FIG. 5 is an enlarged detail view showing the relation of the cover opening with respect to a blade in a slot.

FIG. 5 shows on an enlarged scale a portion which includes the cover opening and one slot with a blade in it. The parts correspond to those in the form of FIGS. 3 and 4 but the description is also applicable in general to the form of FIGS. 1 and 2. For the removal of a blade from the particular slot the cover is rotated to a position such that the narrow portion of the opening 45 coincides with the narrow slot portion 42 of the body member. In general this means that the cover is rotated so that the lug of the detent means occupies its farthest clockwise position in the notch and the cover opening is as shown in full lines in FIG. 5. In such position the blade shank holder 24 may be inserted and the U-shaped portion of the holder slid over the reinforcing backing portion 23. The holder is shown so inserted in FIG. 5 and also in FIG. 2. The holder may then be withdrawn with the blade therein. Likewise with the cover in the position just described a holder with a used blade therein may be inserted in the slot of the container. Then by giving the cover a slight angular rotation counter clockwise whereby the lug 51 reaches the opposite end of the notch 50 and the projecting part 46 of the opening 45 occupies a position over the path of the blade, as shown particularly in broken lines 45a in FIGS. 4 and 5, the holder 24 may be withdrawn with the blade restrained in the slot. The projecting part 29 at the opening 28 in the container of FIGS. 1 and 2 performs the same function as the part 46 first described.

Since various changes and different embodiments of the invention may be made, in addition to those described above, it should be understood that all matter contained in the above description and shown in the accompanying drawing is to be interpreted as illustrative and not in a limiting sense.

I claim:

1. A blade container comprising a body member having a series of slots each shaped to receive a blade therein, a cap and means movably securing it to said member having an opening adapted to register successively with said slots in its progressive movement, said opening being shaped upon full registry with a slot to enable slidable movement therethrough of a blade holder with blade therein or upon a small adjustment from full registry to cause the end of the blade to be engaged by an edge portion of the opening and restrained in the slot and the blade holder withdrawn from the slot.

2. A razor blade container comprising a body member of generally cylindrical shape having a series of open ended radial blade slots extending longitudinally thereof, a cap and means rotatively securing it over the open end and having an opening adapted to be rotated selectively into registry with each of said slots, said opening being in general of a keyhole shape and adapted to receive slidingly therethrough a shank type razor blade holder with blade therein and upon slight angular adjustment of the cap from full registry with a selected slot to engage over the end of the blade and restrain it in the slot upon withdrawal of the holder.

3. A blade container comprising a body member having a series of slots each shaped to receive a blade therein, a cap and means movably securing it to said member having an opening adapted to register successively with said slots in its progressive movement, said opening being generally of a keyhole shape to receive slidingly therethrough a blade holder engageable over the back of the respective blade, and detent means adapted to hold releasably the said opening at the selected slot end, said detent means being constructed and arranged to permit a small amount of free movement at each selected slot whereby in one detent engaged position for the selected slot the blade holder with blade therein is freely slidable through said opening and in the opposite detent engaged position for the selected slot a portion of the cap is adapted to engage over the end of the blade restraining it in the slot while the holder is withdrawn.

4. A razor blade container comprising a body member of generally cylindrical shape having a series of open ended radial blade slots extending longitudinally thereof, a cap and means rotatively securing it over the open end and having an opening adapted to be rotated selectively into registry with each of said slots, a detent means adapted to hold releasably the said opening at the selected slot end and arranged to permit a small amount of free angular movement at each selected slot, said opening being in general of a keyhole shape and adapted when the opening is at one end of its said free movement to receive slidingly therethrough a shank type razor blade holder with blade therein, and when the opening is at the other end of its said free movement having a part positioned over the end of the blade and effective to restrain it in the slot upon withdrawal of the holder.

5. A razor blade container comprising a body member of generally cylindrical shape having a series of open ended radial blade slots extending longitudinally thereof, a cap member and means rotatively securing it over the open end of the body member and having an opening adapted to be rotated selectively into registry with each of said slots, and a detent means adapted to hold releasably the said opening at each selected slot, said detent means comprising a series of notches in one of said members corresponding to the respective slots and a projection on the other member elastically engageable into each said notch, the notch being of a length to permit a limited amount of free angular movement.

6. A razor blade container comprising a body member of generally cylindrical shape having a series of open ended radial blade slots extending longitudinally thereof, a cap member and means rotatively securing it over the open end of the body member and having an opening adapted to be rotated selectively into registry with each of said slots, and a detent means adapted to hold releasably the said opening at each selected slot, said detent means comprising a series of notches in one of said members corresponding to the respective slots and a projection on the other member elastically engageable into each said notch, the notch being of a length to permit a limited amount of free angular movement, and the said opening being so shaped whereby when the opening is at one end of its said free movement at a selected slot a blade holder with blade therein may be freely slid through the opening into and out of the slot, and when the opening is at the opposite end of its said free movement a portion of the cap member is positioned over the path of movement of the blade and restrains it in the slot upon withdrawal of the holder.

References Cited in the file of this patent
UNITED STATES PATENTS

| | | |
|---|---|---|
| 1,183,054 | Weck | May 16, 1916 |
| 1,628,133 | Ferst | May 10, 1927 |
| 2,236,224 | Raschkind | Mar. 25, 1941 |
| 2,351,815 | Jensen | June 20, 1944 |